Figure 1:
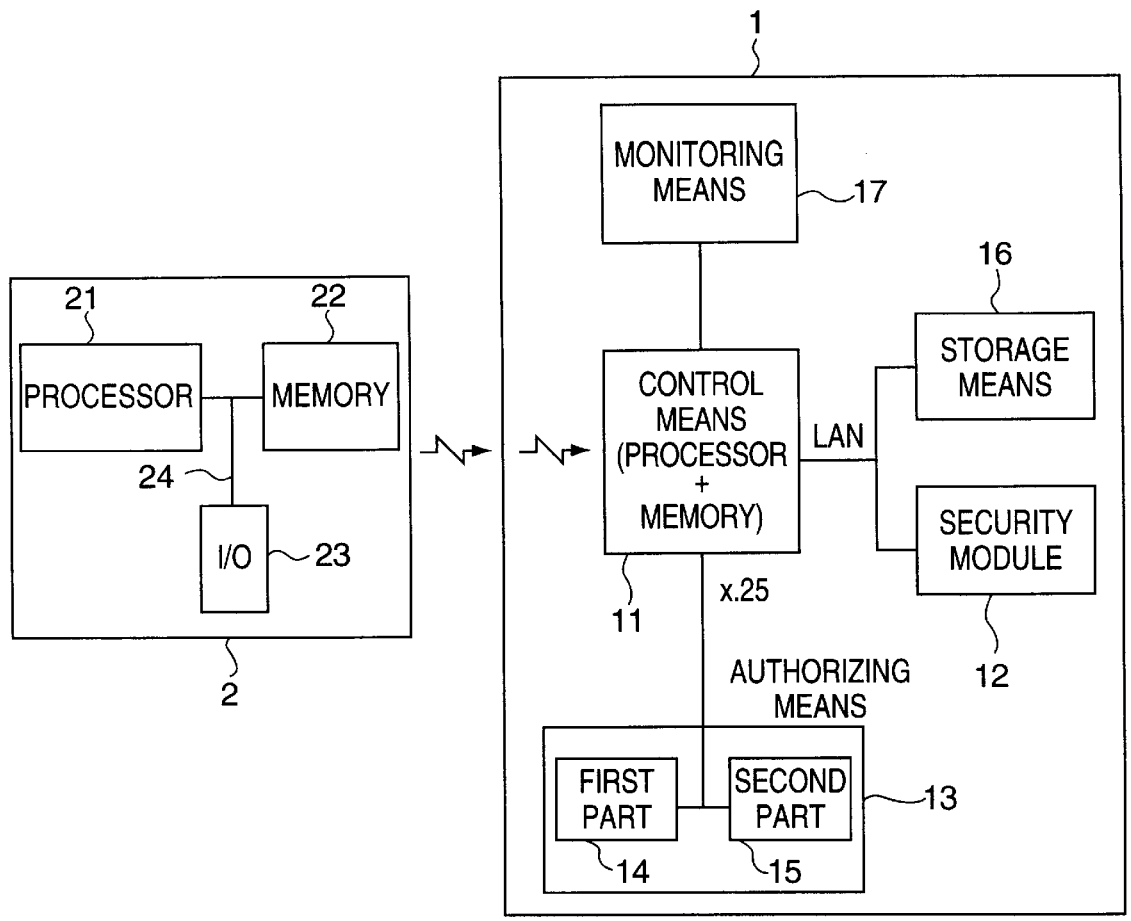

United States Patent [19]

Cheung

[11] Patent Number: 6,062,472

[45] Date of Patent: *May 16, 2000

[54] SYSTEM AND METHOD FOR INCREASING A VALUE OF AN ELECTRONIC PAYMENT CARD INCLUDING PERFORMING A RESTORE TRANSACTION IN RESPONSE TO INTERRUPTION OF A VALUE INCREASE TRANSACTION

[75] Inventor: Wing Keung Cheung, Zoetermeer, Netherlands

[73] Assignee: Koninklijke PTT Nederland N.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,627

[22] Filed: Nov. 18, 1997

[30] Foreign Application Priority Data

Dec. 23, 1996 [EP] European Pat. Off. .............. 96203672

[51] Int. Cl.[7] ...................................................... G06K 5/00
[52] U.S. Cl. .......................... 235/380; 235/379; 235/492; 705/41; 705/44
[58] Field of Search ..................................... 235/379, 380, 235/492; 902/5, 26, 38, 40; 705/35, 39, 41, 44

[56] References Cited

U.S. PATENT DOCUMENTS

| | | |
|---|---|---|
| 4,058,839 | 11/1977 | Darjany ........................................ 360/2 |
| 4,746,786 | 5/1988 | Heberle et al. . |
| 5,093,787 | 3/1992 | Simmons ............................. 235/379 X |
| 5,097,115 | 3/1992 | Ogasawara et al. .................... 235/380 |
| 5,155,342 | 10/1992 | Urano . |
| 5,175,416 | 12/1992 | Mansvelt et al. . |
| 5,221,838 | 6/1993 | Gutman et al. . |
| 5,247,578 | 9/1993 | Pailles et al. . |
| 5,264,689 | 11/1993 | Maes et al. . |
| 5,285,055 | 2/1994 | Oonakahara et al. . |
| 5,329,589 | 7/1994 | Fraser et al. .......................... 705/44 X |
| 5,396,558 | 3/1995 | Ishiguro et al. . |
| 5,428,684 | 6/1995 | Akiyama et al. . |
| 5,440,634 | 8/1995 | Jones et al. ............................... 380/24 |
| 5,495,098 | 2/1996 | Pailles et al. . |
| 5,539,825 | 7/1996 | Akiyama et al. ......................... 380/24 |
| 5,559,313 | 9/1996 | Claus et al. ............................. 235/380 |
| 5,767,504 | 6/1998 | Menconi ................................. 235/492 |
| 5,796,092 | 8/1998 | Nagata et al. .......................... 235/492 |
| 5,884,292 | 3/1999 | Baker et al. ....................... 235/375 X |

FOREIGN PATENT DOCUMENTS

| | | |
|---|---|---|
| 0 619 564 | 10/1994 | European Pat. Off. . |
| 0 621 570 | 10/1994 | European Pat. Off. . |
| 0 623 903 | 11/1994 | European Pat. Off. . |
| 0 671 712 | 9/1995 | European Pat. Off. . |
| 44 27 039 | 2/1996 | Germany . |
| WO 96/36947 | 11/1996 | WIPO . |

*Primary Examiner*—Donald Hajec
*Assistant Examiner*—Jared Fureman
*Attorney, Agent, or Firm*—Michaelson & Wallace; Peter L. Michaelson

[57] ABSTRACT

A system for increasing the value of an electronic payment card. The system comprises, e.g., a security module arranged for authentication of the card, and an authorizing device for authorizing a value increase transaction to the card. The system is arranged for sending a value increase message to the card, upon which the value stored in memory in the card is increased, if the card has been found to be authentic and the value increase transaction thereof has been authorized. The system also has memory, in which identification data of the card is stored and, linked thereto, data relating to the authorization of the value increase of the card. If a value increase transaction is interrupted after authorization for the transaction had been given, a restore transaction occurs. In the restore transaction, the authenticity of the card is checked and the value increase transaction occurs on the basis of the authorization information previously stored in the system memory during the value increase transaction. Hence, through the system, interrupted value increase transactions may be recovered without the need for a new authorization.

8 Claims, 6 Drawing Sheets ized given by the authorization means. The fact, that during the restore transaction no new authorization is to be given is favourable, because no new communication session with the authorization means, which are normally placed at another place than the rest of the system, is necessary, during the restore transaction. So, the user has a guarantee, that the value of his card is indeed increased, once the authorization therefore has been given.

SYSTEM AND METHOD FOR INCREASING A VALUE OF AN ELECTRONIC PAYMENT CARD INCLUDING PERFORMING A RESTORE TRANSACTION IN RESPONSE TO INTERRUPTION OF A VALUE INCREASE TRANSACTION

BACKGROUND OF THE INVENTION

The present invention relates to a system for increasing a value of an electronic payment card. In the last years the use of electronic payment cards has increased, considerably. Such electronic payment cards generally comprise a processor and a memory, connected by a data bus. The value of an electronic payment card, representing a monetary value, is stored in the memory. When a payment is made with the electronic payment card, the value stored in the memory is decreased with the amount corresponding to the payment. Apart from carrying out payment transactions with the card, the user may increase the value thereof. Thereto the card should be connected to a system for increasing the value thereof. During the value increase transaction, the value stored in the memory is increased upon reception by the card of the value increasing message. The amount of money, that the value of the card is increased, is deducted from the bank account of the user or is charged to him in another way. The card and the value increasing system communicate with each other using encrypted messages, thereby minimizing the chance that so called "hackers" are able to carry out non-authorized value increase transactions.

SUMMARY OF THE INVENTION

Known systems for increasing the value of electronic payment cards, do not have a satisfactory solution for dealing with the situation that an interruption of a value increase transaction occurs. Such an interruption may be caused by e.g. a power failure or by a premature withdrawal of the card from a card reader. It is an object of the present invention to provide a system allowing recovery of interrupted transactions.

Thereto the system according to the present invention comprises:

a security module, or authentication device amongst others, for authentication of the card, authorization means for authorizing the value increase transaction of the card, the system being arranged for sending a value increase message to the card increasing the value thereof, if the card has been found authentic and the value increase transaction thereof has been authorized, the system further comprising storage means for storing identification information of the card and linked thereto information about the authorization of the value increase transaction, wherein the system is arranged to carry out a restore transaction, if the value increase transaction has failed after authorization thereto had been given, during the restore transaction the security module being arranged for authentication of the card, and the system, if the card has been found authentic, being arranged for increasing the value of the card according to the authorization information stored during the value increase transaction. In the system according to the present invention, due to the storage of information relating to the authorization of the value increase transaction this information at least comprising the increase value that has been authorized by the authorization means, in case of an interruption, the value increase transaction can be recovered, completely, without the need for a new authorization given by the authorization means. The fact, that during the restore transaction no new authorization is to be given is favourable, because no new communication session with the authorization means, which are normally placed at another place than the rest of the system, is necessary, during the restore transaction. So, the user has a guarantee, that the value of his card is indeed increased, once the authorization therefore has been given.

According to a preferred embodiment of the present invention, the system is arranged for comparing a card profile received from the card and a card profile stored by the authorization means. The card profile comprises certain data relating to the rights of the user of the card, such as the maximum amount of money which may be present on the card, the minimum amount of money, that a value increase of the card should be, etc. If the card profile stored by the authorizing means is different from the one received from the card itself, the system adopts a procedure of changing the card profile of the card into the one stored by the authorizing means. In this way, during a value increase transaction the profile of the card can also be updated. This has the advantage that, if a user manages to carry out a non-authorized change of the profile of his card, the profile is overwritten by the correct profile as stored by the authorization means, during the next value increase transaction of the card.

According to a further preferred embodiment, the system according to the invention comprises monitoring means for monitoring the security module and storage means. As soon as a malfunction of one of these occurs, the monitoring means sends an alarm signal, for example, to a system operator. For maintaining the reliability of the system at a high level, the correct functioning of the storage means and the security module is of importance, since the malfunction of one of them makes restore transactions impossible.

The present invention further relates to a method for increasing the value of an electronic payment card.

BRIEF DESCRIPTIONS OF THE DRAWINGS

Figure 2:
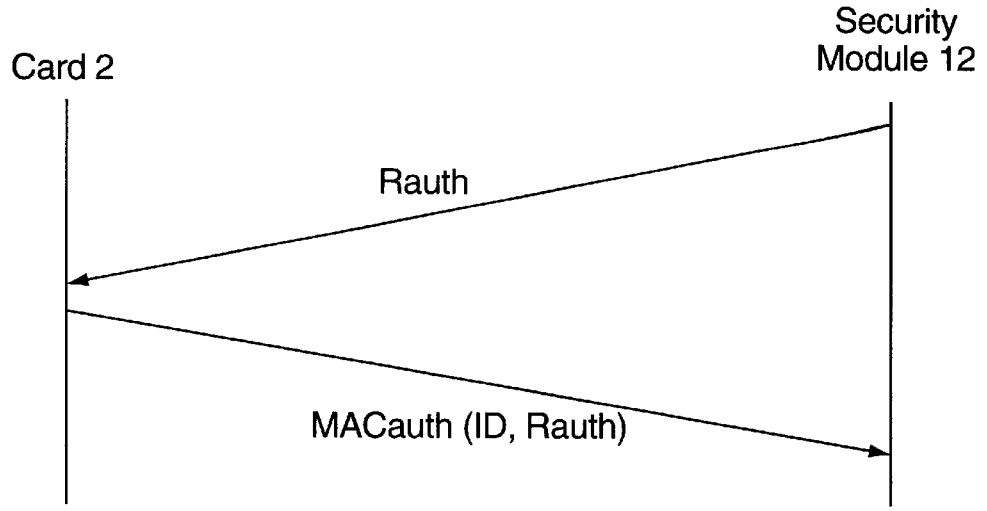
Figure 3A:
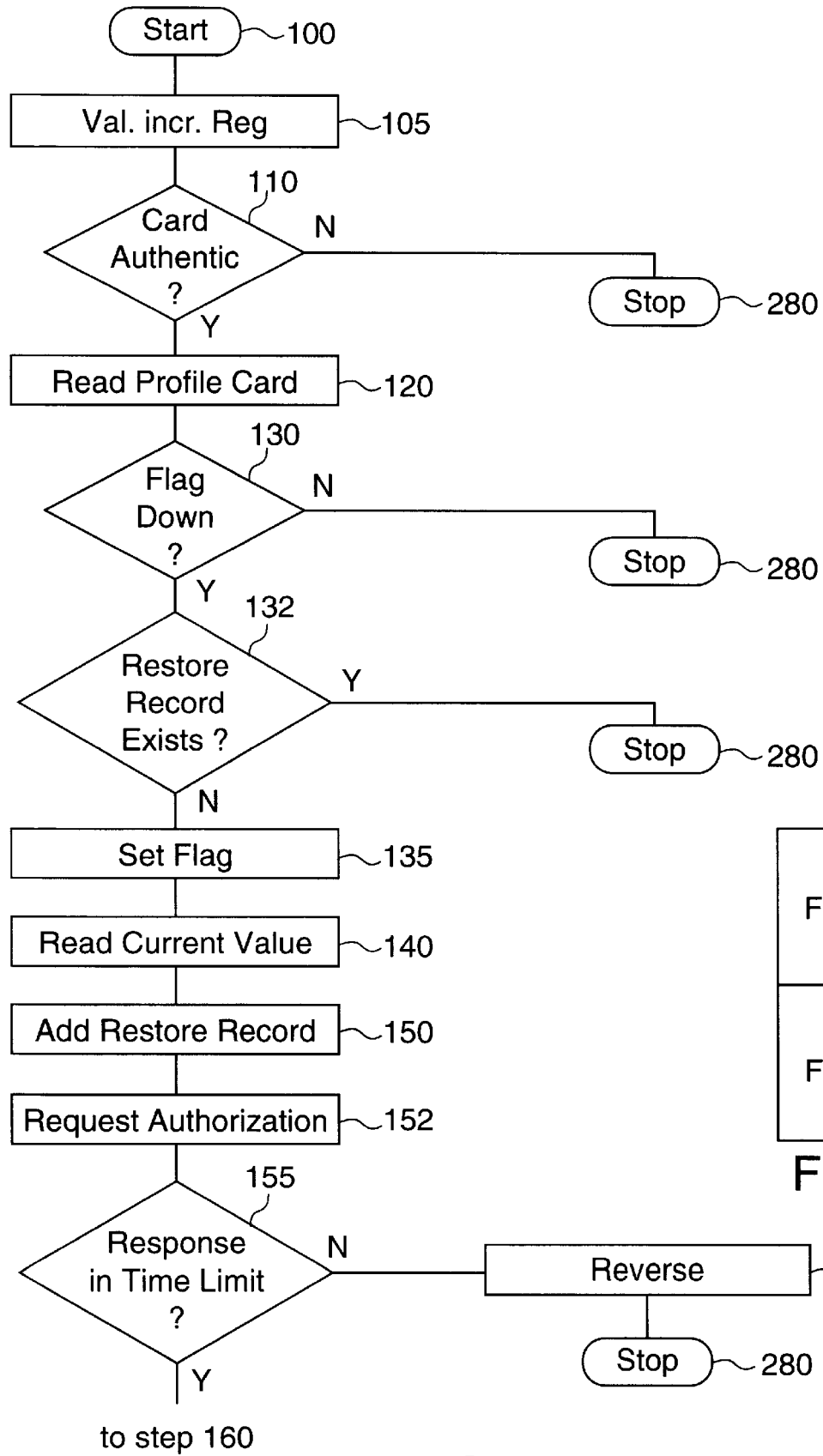
Figure 3B:
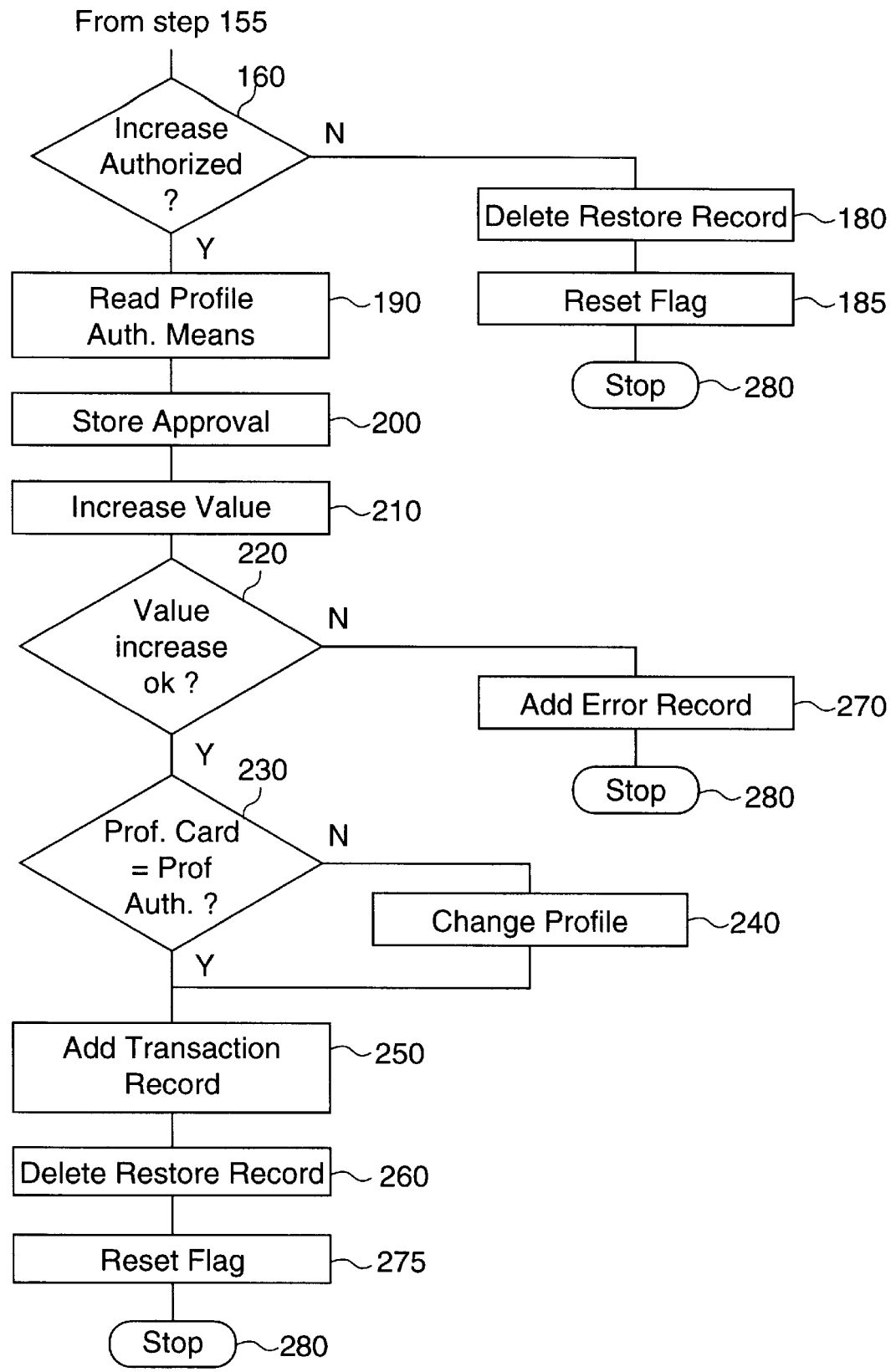

The invention will be further explained with reference to the accompanying drawings, in which:

FIG. 1 schematically shows an electronic payment card and a system for increasing the value thereof, FIG. 2 shows the exchange of cryptographic messages between the security module of the system and the card during the authentication of the card, FIG. 3 depicts the correct alignment of the drawing sheets for FIGS. 3A and 3B.

Figure 4:
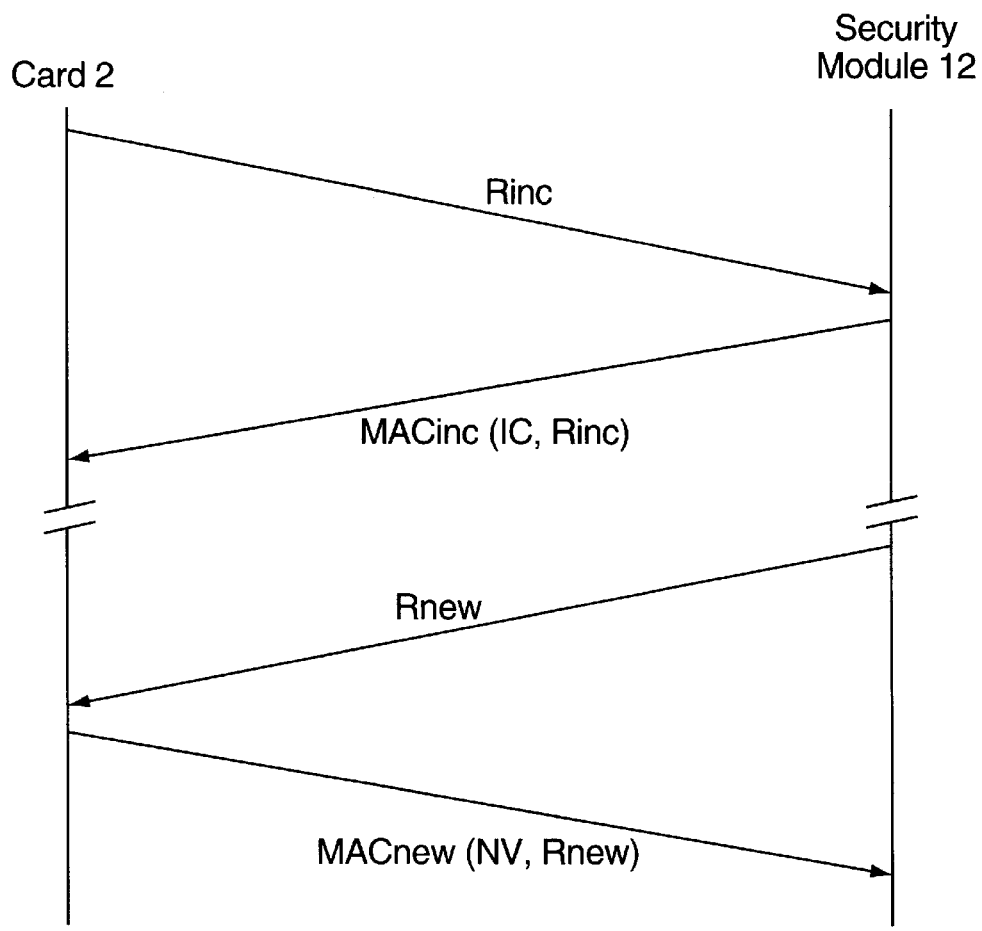
Figure 5A:
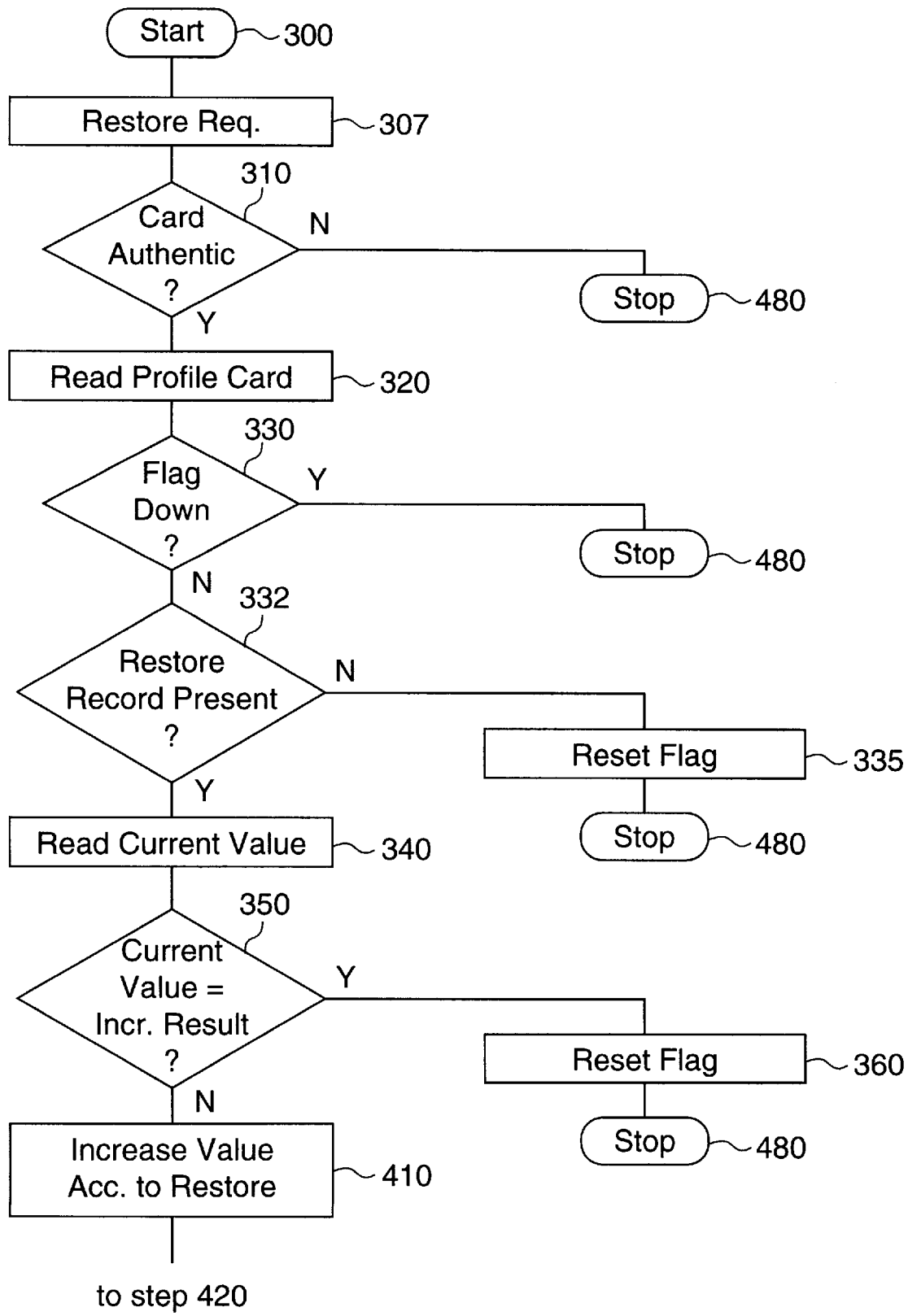
Figures 5, 5A, 5B:
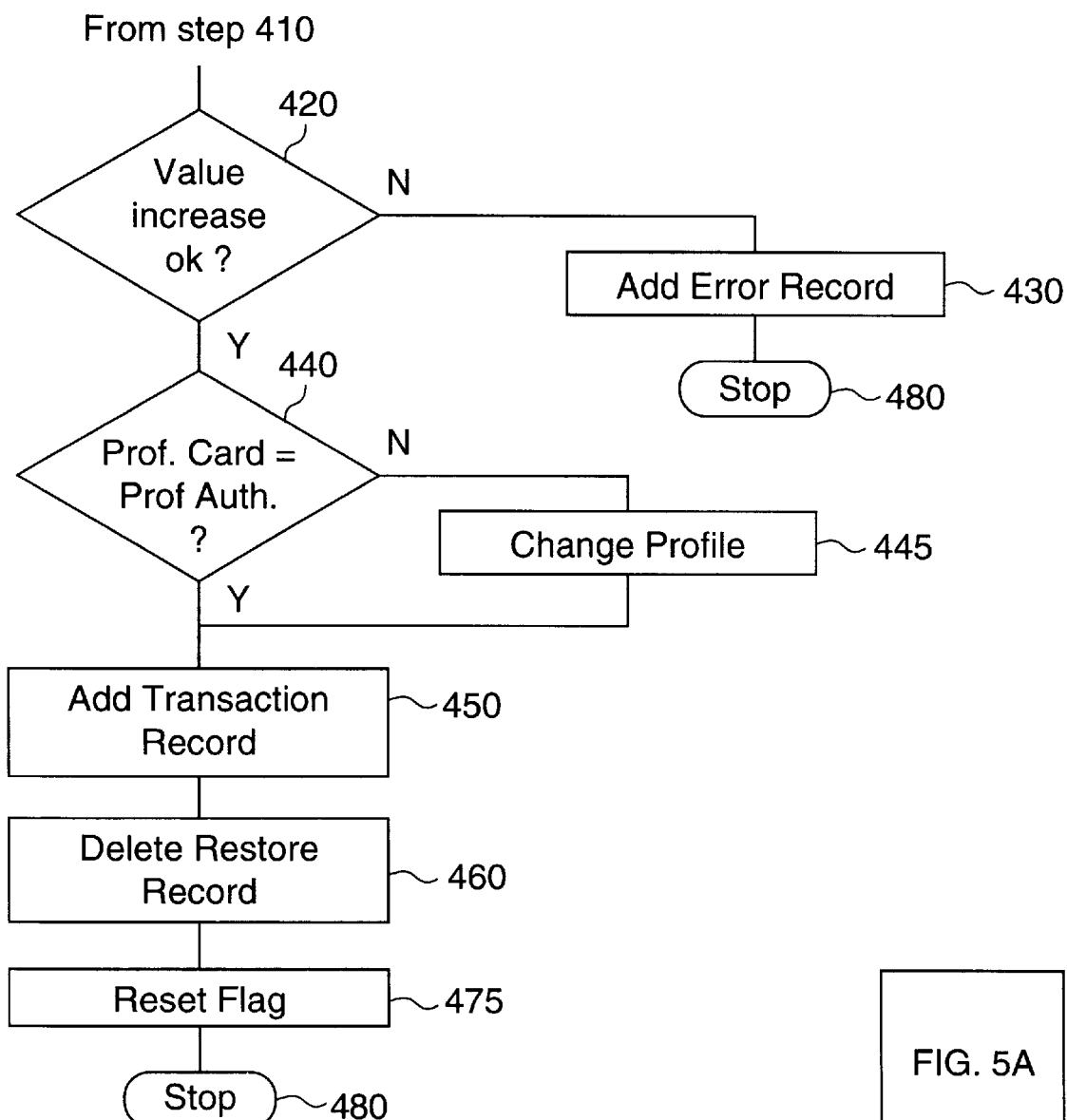

FIGS. 3A and 3B schematically show a flow chart of a value increase transaction of the electronic payment card, FIG. 4 shows a further exchange of cryptographic messages between the security module of the system and the card during the value increase transaction, FIG. 5 depicts the correct alignment of the drawing sheets for FIGS. 5A and 5B.

Figure 6:
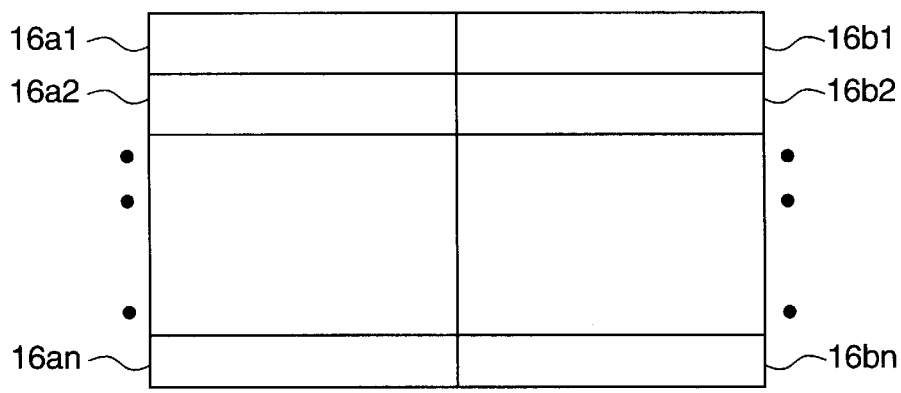

FIGS. 5A and 5B schematically show a flow chart of a restore transaction carried out upon an interruption of a value increase transaction, and FIG. 6 schematically shows restore records present in the storage means of the system according to FIG. 1.

EXEMPLARY EMBODIMENTS

FIG. 1 schematically shows a system 1 for increasing the value of an electronic payment card 2. The electronic payment card 2 comprises a processor 21, a memory 22 (e.g.

RAM and/or EEPROM) and an I/O (input/output) circuit 23 linked by a data bus 24. In the memory 22 of the electronic payment card a number of data are stored, such as the value of the card i.e. data representing a monetary value, card identification data and also a so-called card profile, comprising data regarding the rights of the user of the card, like the maximum permitted value present on the card and the minimum and maximum permitted value of an increase transaction. During a value increase transaction, the system 1 and the card 2 have to communicate with each other. Thereto, the card should be inserted in a generally known card reader/writer (not shown). Via a user interface, the user makes choices regarding the value increase transaction he wishes to be carried out. In order to avoid that a value increase transaction is requested by persons other than the user, who have stolen or found the card 2, the user is prompted to type a Personal Identification Code (PIN). If this code is correct, the card reader/writer establishes a communication session with the system 1 via suitable communication means, such as for example the Public Switched Telephony Network (PSTN). The system 1 comprises control means 11, a security module or authentication device 12, authorizing means 13, consisting of a first part 14, authorizing value increase transactions via bank account and a second part 15, authorizing value increase transactions via credit card account. Furthermore it comprises storage means 16 and monitoring means 17. The control means 11, the security module 12 and the storage means 16 are preferably connected by a local area network (LAN). The authorization means 13 and the control means 11 are preferably connected by a network functioning according to the X.25-standard. Any other suitable connections between the control means 11, security module 12, storage means 16 and authorization means 13 may, however, be used. The control means 11 are formed by a processor and an associated memory. If the number of transactions to be handled by the system 1 is large, there may be arranged a plurality of processors with associated memories, working in parallel. So, the control means 11 may be extended, in dependence of the amount of increase transactions to be handled by the system. The control means are loaded with software having the following functionalities:

card authentication, transaction authorization, handling transactions, and closing transactions.

In order to carry out these functionalities the control means 11 are arranged to send and receive messages to and from the card 2 and also to and from the storage means 16, the security module 12 and the authorization means 13, using appropriate communication protocols.

The security module or authentication device 12 is arranged for encrypting and decrypting messages going to and coming from the electronic payment card using appropriate cryptographic algorithms, known per se, for example, from the publication "Electronic banking using smartcards", SMART CARD '90. Int. Exh. and Conf. PLF Commun, vol. 2, 1990, pp M1–8 or from the book "Security for Communication Networks" of Davis and Price. The security module 12 and the control means 11 are shown separated in FIG. 1, but they may, however, also be arranged in one and the same physical unit. Only a logical separation between them is present, then. The security module 12, amongst others, is arranged for authentication of the card 2. This is done by a so called challenge-signed response procedure, as shown in FIG. 2. The security module 12 generates a random number $R_{auth}$ and sends this (via the control means 11) to the card 2.

The card 2, using a secret key stored within the card, calculates a so-called Message Authentication Code $MAC_{auth}$ on the basis of the random number $R_{auth}$ and card identification data ID and sends it (via the control means 11) to the security module 12. This code may be generated using a suitable cryptographic function, such as a so-called hash function. The security module 12 also calculates this Message Authentication Code $MAC_{auth}$ on basis of $R_{auth}$ and ID, using the same secret key as the card 2. If the MACs calculated by the card and the security module are the same, the card is authentic. During the whole authentication procedure, the control means 11 facilitate a message channel between the card 2 and the security module 12. As soon as the authentication procedure is terminated, the security module 12 communicates the result thereof to the control means 11. If the card has been found authentic, the control means 11 send an authorization request comprising identification data of the card 2 to the authorization means 13. The authorization means 13 are arranged for deciding if a requested value increase is to be authorized. Means 13 is divided into a first part 14 and a second part 15. The first part 14 is arranged for checking if the state of the bank account of a user requesting a value increase of his electronic payment card is such, that the increase transaction can be authorized. The second part 15 is arranged for checking, if the limit of a user's credit is passed, if the requested value increase transaction is carried out. If the user's credit is not exceeded, the increase transaction can be authorized. The authorization means normally are not placed at the same place as the rest of the value increase system but, for example, in a secure room at the premises of a bank. A plurality of authorization means belonging to various banks may be present, but is not shown in FIG. 1 for reasons of simplicity. The authorization means 13 send the result of the authorization request to the control means. If the card 2 is authentic and the transaction is authorized, the control means 11 adopt a procedure for increasing the value of the electronic payment card 2. This procedure is also a so-called challenge-signed response procedure and will be further described in the sequel.

The control means 11 are furthermore arranged, as soon as the value increase transaction of the card 2 is authorized, to write identification data of the card 2 and linked thereto data relating the authorization of the value increase transaction in the restore record of the storage means 16. The data relating to the authorization comprises at least the current value of the card 2 and the increase value, that has been authorized by the authorization means. The restore record is shown in FIG. 6. In records 16a(1,2 . . . ,n) identification data of the card 2 is to be written and linked thereto in records 16b(1,2 . . . ,n) authorization information of the respective transactions 1,2 . . . ,n. If the value increase transaction fails after authorization thereto has been given, the stored information is used for carrying out a restore transaction. In this restore transaction it is checked if the card 2 is authentic, its identification data are looked up in the restore table and its value is increased according to the authorization information linked to the identification data. If the control means 11 consist of more than one processor, all processors are arranged to read and write restore information to the same restore record. This is necessary, because a restore transaction of a card may be carried out by another processor than the initial value increase transaction of the card. Because the same restore record is used by all processors, the authorization information stored by one of them during a value increase transaction can be found by any other processor during a restore transaction.

The monitoring means 17 are arranged for monitoring the security module 12, the control means 11 and storage means 16. As soon as a malfunction of one of these occurs, the monitoring means 17 sends an alarm signal for example to a system operator. It is very important, that the control means 11, security module 12 and storage means 16 work well, since the malfunction of one of them makes restore transactions impossible.

FIGS. 3A and 3B show a flow chart of the steps carried out by the system 1 during a normal value increase transaction i.e. no restore transaction. After step 100 (START) in step 105 (VAL. INCR. REQ.) a value increase request is received from the card reader/writer in which the electronic payment card 2 has been brought. In step 110 (CARD AUTHENTIC?) the authenticity of the card is checked using the challenge-signed response procedure shown in FIG. 2. If the card is not authentic, the transaction is stopped (step 280, STOP). If the card is authentic, in step 120 (PROFILE CARD), the control means 11 receive from the card 2 the profile as currently stored in its memory 22. The profile is made up by certain data, defining the rights of the card's user such as the maximum value which may be present on the card, the minimum amount of a value increase transaction, etc. In step 130 (FLAG DOWN?) it is checked, if a flag for the card stored in the card memory 22, is down (reset). If this is not the case, as will be explained later, the card is in an undefined state and probably a fraud attempt is being carried out. The transaction is then stopped. In step 132 (RESTORE RECORD EXISTS?) it is checked if there is already a restore record of the card 2. If a restore record is present in this stage of a value increase transaction, the transaction is stopped. If the restore recored does not exist, the process continues to step 135. In step 135 (SET FLAG) the flag of the card is set. In step 140 (READ CURRENT VALUE) the value currently stored in the memory of the card is read out. In step 150 (OPEN RESTORE RECORD), a restore record in the storage means 16 is opened. In step 152 (REQUEST AUTHORIZATION) the authorization of the value increase is requested to the authorization means 13. In step 155 (RESPONSE IN TIME LIMIT?) it is checked if the authorization means give a response within a certain time limit. If this is not the case, in step 157 (REVERSE) a reverse transaction is started, undoing the value increase transaction. No money is deducted from the user's bank account or charged to the user in any other way, then. In step 160 (INCREASE AUTHORIZED?) it is checked if, the increase request is authorized. If this is not the case, because the amount of money in the bank account of the user is not sufficient, in step 180 (DELETE RESTORE RECORD) the restore record opened in step 150 is deleted and in step 185 (RESET FLAG) the flag of the card is reset. If the increase is not authorized for another reason, e.g. the card 2 is reported stolen, an error record is opened and the flag of the card 2 is not reset (steps not shown). If the increase request is authorized in step 190 (READ PROFILE AUTH. MEANS) the profile of the card, stored by the authorization means is read. In step 200 (STORE APPROVAL), the authorization data received from the authorization means 13 are stored in the restore record. The authorization data comprise the current value of the card 2 (read in step 140) and the increase value, that has been authorized by the authorization means 13. In step 210 (INCREASE VALUE) a value increase message is sent to the card, increasing the value stored in the memory thereof. In step 220 (VALUE INCREASE OK?) it is checked if the value increase has been carried out, correctly. In FIG. 4 the messages, which are exchanged between the card 2 and the security module 12 in order to carry out steps 210 and 220 are shown. The card generates a random number $R_{inc}$ and sends this to the security module 12. The security module calculates a Message Authentication Code $MAC_{inc}(IC,R_{inc})$ on basis of an increase command IC, being the amount, that the value of the electronic payment card 2 is to be increased, and the random signal $R_{inc}$. The card 2 checks the value of $MAC_{inc}$ and, if it is correct increases its value according to increase command IC. By using the Message Authentication Code, which can only be calculated by the card 2 and the security module 12, the card 2 is able to check if the message really comes from the security module 12. Subsequently the security module 12 calculates a random number $R_{new}$ and sends it to the card 2. The card calculates a Message Authentication Code $MAC_{new}(NV,-R_{new})$ on basis of the new value NV of the card 2 and the random number $R_{new}$ and sends it to the security module 12. The security module 12 checks if $MAC_{new}$ is right and, if this the case, sends the new value of the card 2 to the control means 11. Thereupon the control means 11 check if the value increase transaction has been carried out, correctly. If the value increase is not okay, in step 270 (ADD ERROR RECORD), shown in FIG. 3B, an error message is written in a newly added error record. The flag of the card is then not reset. If the value increase is okay, in step 230 (PROF CARD=PROF AUTH.?) it is checked if the profile stored in the card is equal to the profile stored by the authorization means. If this is not the case in step 240 (CHANGE PROFILE) the profile as stored by the authorization means 13 is written in the memory 22 of the card 2. In step 250 (ADD TRANSACTION RECORD) a transaction record is added and the result of the transaction is written into the transaction record. In step 260 (DELETE RESTORE) the restore record is deleted. In step 275 (RESET FLAG) the flag of the card is reset.

For every communication step in which the card 2 is involved, e.g. the flag setting and resetting operation and the profile reading and profile modification of the card 2, messages between the security module 12 and the card 2 according to so-called challenge-signed response procedures are used, as already described with respect to the authentication procedure and the value increase operation. During the challenge-signed response procedure the control means 11 facilitate a message channel between the card 2 and the security module 12.

In FIGS. 5A and 5B a flow chart is shown of the steps of the system 1, in case of a restore transaction, of a value increase transaction that failed after authorization thereto had been given and the authorization information had been stored i.e. after step 200 in FIG. 3. After START (step 300) in step 307 (RESTORE REQ.) a restore request is received. If a value increase transaction, as shown in FIG. 3, has not been terminated in a normal way the flag for the card 2 is up (set). The card reader/writer into which the electronic payment card 2 is to be brought, is arranged for sending a restore request to the system 1, if it sees that the flag of the card 2 is up. The card reader/writer is arranged to send a value increase request, if it sees, that the flag of the card 2 is down (step 105 of FIG. 3). The flag setting and resetting mechanism of electronic payment cards is described in more detail in applicant's patent application EP 0 700 023. In step 310 the authenticity of the card is checked, using the challenge-signed response procedure shown in FIG. 2. If the card is not authentic the transaction is stopped (step 480, STOP). If the card is authentic, in step 320 (READ PROFILE CARD) the profile of the card is read. In step 330 (FLAG DOWN?) it is checked if the flag is down. If this is the case, the transaction is stopped, because the flag of a card requesting a restore transaction should be up, as already explained. The flag being down together with the request of a restore transaction indicate, that possibly a fraud attempt is them being carried out. If the flag is up, in step 332 (RESTORE RECORD PRESENT?) it is checked if a restore record belonging to the card 2 is present. If such a record is not present, and in step 335 (RESET FLAG) the flag is reset, and subsequently the transaction is stopped (step 480, STOP). In step 340 (READ CURRENT VALUE) the value stored in the card is read. In step 350 (CURRENT VALUE= INCR.RESULT?) it is checked if the current value read from the memory of the card 2 in step 340 is equal to the increased value of the card as stored in the restore record during the initial value increase transaction (STEP 150, FIG. 3). If this is the case, apparently during the initial value increase transaction, the value increase step 210 has been carried out, correctly but due to an interruption afterwards, the flag of card 2 has not been reset. If this is the case, no additional value increase should be carried out. The flag of the card is then reset (step 360, RESET FLAG). Also, the restore record is deleted.

In step 410 (INCREASE VALUE ACC. TO RESTORE), the restore record of the failed value increase transaction is read and the value of the card is increased according the information stored therein. In step 420 (VALUE INCREASE OK?), it is checked if, the value increase has been carried out, correctly. If the value increase is not correct, in step 430 (ADD ERROR REC.) an error record is added and subsequently the restore transaction is stopped (step 480, STOP). A new restore transaction may be started afterwards. If the value increase has been carried out correctly, in step 440 (PROF.CARD=PROF.AUTH.?) it is checked if the profile stored in the memory of the card is the same as the profile stored by the authorization means. If this is not the case in step 445 (CHANGE PROFILE) the profile as stored by the authorization means is written in the memory of the card. In step 450 (ADD TRANSACTION RECORD) a transaction record is added and the result of the transaction is written into the transaction record. In step 460 (DELETE RESTORE) the restore record is deleted. In step 475 (RESET FLAG) the flag of the card is reset.

Also during the restore transaction, for security reasons all messages sent to and received from the card 2 are encrypted according to challenge-signed response procedures.

It will be understood by those skilled in the art, that the embodiment described above is given by way of example only and that many modifications and additions are possible without departing from the scope of the present invention.

What is claimed is:

1. A system for performing a restore transaction, in response to interruption of a value increase transaction involving a particular electronic payment card, after an authorization for the transaction has been given to the card for the value increase transaction, wherein the particular card stores a balance, the system comprising:
   (A) an authentication device which determines authenticity of the card and, in response thereto, generates an authentication of the card;
   (B) an authorization device which checks authenticity of the card and generates an authorization to increase the balance of the card;
   (C) a storage device which stores a plurality of restore records, each one of the records having identification data, which identifies a corresponding one of a plurality of electronic payment cards, and authorization data which authorizes an increase of a balance stored in the corresponding one card; and
   (D) a control device coupled to the authentication device, the authorization device, and the storage device, the control device being capable of communicating with the card;
   (E) wherein the control device performs the value increase transaction which, prior to the interruption, comprises the operations of:
      (E1) receiving the payment card authentication for the particular card so as to define a received payment card authentication;
      (E2) receiving the balance increase authorization for the particular card so as to define a received balance increase authorization;
      (E3) generating a balance increase message in response to the received payment card authentication and the received balance increase authorization; and
      (E4) sending the balance increase message, including the received balance increase authorization, to the storage device such that the received balance increase authorization can be stored, as authorization data, in an associated one of the restore records corresponding to the particular card; and
   (F) wherein the control device performs the restore transaction which, after the interruption of the value increase transaction occurs, comprises the operations of:
      (F1) determining that the value increase transaction was interrupted; and
      (F2) ascertaining a last value increase transaction message sent prior to the interruption and resuming the value increase transaction at its point of the interruption, wherein the resuming operation further checks authenticity of the particular card and performs the last value increase transaction, after the interruption, in response to the authorization data stored in said associated one restore record, wherein the performing operation:
         (F2a) retrieves the authorization data, for the particular card, stored in the associated one restore record, so as to define a retrieved balance increase authorization; and
         (F2b) re-sends the balance increase message to the particular card in response to the retrieved balance increase authorization.

2. The apparatus recited in claim 1 wherein the apparatus compares a card profile received from the particular card and a card profile stored by the authorization device, and if the profiles are different, writes the profile stored by the authorization device into the particular card.

3. The apparatus recited in claim 1 further comprising monitoring means for monitoring the authentication device and the storage device, wherein the monitoring means generates an alarm signal upon malfunction of either the authentication device or the storage device.

4. The apparatus recited in claim 1 wherein the control device determines, by communicating with the particular card, that the value increase transaction was interrupted.

5. The apparatus recited in claim 4 wherein the control device determines, by observing a state of a flag stored in the particular card, that the value increase transaction was interrupted.

6. A method for use in conjunction with an electronic payment card, the electronic payment card capable of storing a balance, the method comprising the steps of:
   (A) generating an authentication of the electronic payment card;
   (B) generating an authorization to increase the balance of the electronic payment card;

(C) storing a plurality of restore records in a storage device, each one of the records having identification data, which identifies a corresponding one of a plurality of electronic payment cards, and authorization data which authorizes an increase of the balance of the corresponding one payment card;

(D) performing an increase transaction in a control device for a particular one of the plurality of payment cards, wherein the increase transaction performing step comprises:
  (D1) receiving authentication of the particular one payment card so as to define a received payment card authentication;
  (D2) receiving the balance increase authorization for the particular one payment card so as to define a received balance increase authorization;
  (D3) generating a balance increase message in response to the received payment card authentication and received balance increase authorization; and
  (D4) sending the balance increase message, including the received balance increase authorization, to the storage device such that the balance increase authorization is stored in a corresponding one of the restore records associated with the particular one payment card; and (E) performing a restore transaction if the increase transaction for the particular one payment card was interrupted, wherein the restore transaction performing step comprises:
  (E1) determining that the increase transaction was interrupted;
  (E2) retrieving authorization data stored in the corresponding one restore record so as to define a retrieved balance increase authorization; and
  (E3) re-sending the balance increase message to the particular one payment card in response to the retrieved balance increase authorization.

7. The method recited in claim 6 wherein the determining step comprises a step of communicating with the particular one payment card.

8. The method recited in claim 7, wherein the determining step comprises a step of observing a state of a flag stored in the particular one payment card.

* * * * *